United States Patent [19]

Winderman

[11] 4,088,997
[45] May 9, 1978

[54] SINGLE CHANNEL MONOPULSE RADAR SYSTEM

[75] Inventor: Jay B. Winderman, Claremont, Calif.

[73] Assignee: General Dynamics Corporation, Pomona, Calif.

[21] Appl. No.: 772,623

[22] Filed: Feb. 28, 1977

[51] Int. Cl.² .............................................. G01S 9/22
[52] U.S. Cl. .................................................. 343/16 M
[58] Field of Search .................................... 343/16 M

[56] References Cited

U.S. PATENT DOCUMENTS

| | | | |
|---|---|---|---|
| 2,980,906 | 4/1961 | McClellan | 343/16 M |
| 3,175,215 | 3/1965 | Blasberg | 343/16 M |
| 3,185,982 | 5/1965 | Case et al. | 343/16 M |
| 3,560,974 | 2/1971 | Lecourtier et al. | 343/16 M |
| 3,893,116 | 7/1975 | Hudspeth et al. | 343/16 M |
| 3,977,000 | 8/1976 | Wagner | 343/16 M |

FOREIGN PATENT DOCUMENTS 832,662   4/1960   United Kingdom .............. 343/16 M

*Primary Examiner*—T.H. Tubbesing
*Attorney, Agent, or Firm*—Neil F. Martin; Edward B. Johnson

[57] ABSTRACT

A single channel monopulse radar system including an antenna for transmitting and receiving pulsed radar signals; an arithmetic matrix for providing a pulsed sum information signal, a pulsed azimuth difference information signal and a pulsed elevation difference information signal in response to the pulsed radar signals transmitted and received by the antenna, wherein said information signals are RF signals; an azimuth phase comparator for comparing the sum signal to the azimuth difference signal to provide an azimuth angle error signal; and an elevation phase comparator for comparing the sum signal to the elevation difference signal to provide an elevation angle error signal. An RF delay line separately delays the pulsed sum and difference information signals so as to provide a multiplexed signal in which the three pulsed information signals appear serially and are closely spaced in time. A mixer converts the multiplexed signal from an RF signal to an IF signal. An IF amplifier amplifies the multiplexed IF signal and an IF delay line having separate output terminals restores the phase relationship between the pulsed sum and difference information signals contained in the amplified, multiplexed, IF signal, and simultaneously provides the restored signals at respective separate output taps to the phase comparators.

5 Claims, 3 Drawing Figures

SINGLE CHANNEL MONOPULSE RADAR SYSTEM

BACKGROUND OF THE INVENTION

The present invention generally pertains to radar sytems and is particularly directed to an improvement in a monopulse radar system.

In monopulse radar systems an arithmetic matrix is coupled to an antenna for providing pulsed information signals in response to the radar signals transmitted and received by the antenna. These information signals include a sum signal, an azimuth difference signal and an elevation difference signal. The system further includes an azimuth phase comparator for comparing the sum signal to the azimuth difference signal to provide an azimuth error signal, and an elevation phase comparator for comparing the sum signal to the elevation difference signal to provide an elevation error signal.

However, the information signals provided by the arithmetic matrix are RF (radio frequency) signals, whereas the phase comparators typically are designed for processing IF (intermediate frequency) signals.

Accordingly in a typical prior art monopulse radar system, a plurality of parallel channels, each including a mixer and/or an IF amplifier and/or a mixer-IF amplifier combination, simultaneously process the RF information signals in order to provide IF information signals to the phase comparators. In such prior art systems it is necessary that these parallel channels precisely track one another both in amplitude variations and in phase in order to provide information signals to the phase comparators that have the same phase and amplitude relationship as the information signals provided from the arithmetic matrix. Such precision is not readily attained, and as a result, the typical prior art monopulse radar systems are not always reliable.

SUMMARY OF THE INVENTION

The present invention is a single channel monopulse radar system, that is characterized by an RF delay line for separately delaying the pulsed sum and difference information signals so as to provide a multiplexed signal in which the three pulsed information signals appear serially and are closely spaced in time; a single mixer for converting the multiplexed signal from an RF signal to an IF signal; an IF amplifier for amplifying the multiplexed IF signal; and an IF delay line having separate output taps for restoring the phase relationship between the pulsed sum and difference information signals contained in the amplified, multiplexed, IF signal and for simultaneously providing the restored signals at respective separate output taps to the phase comparators.

The single channel monopulse radar system of the present invention is inherently simpler and more reliable than typical prior monopulse radar systems which include a plurality of parallel channels that have a mixer and/or IF amplifier. As a result the phase relationships among the information signals are maintained as the information signals are processed from the arithmetic matrix to the phase comparators, because any additional phase shifts introduced by the mixer and IF amplifier are applied equally to all three information signals.

Preferably, the RF delay line includes separate input taps for receiving the pulsed sum and difference signals, with the electrical spacing between the taps of both delay lines being unequal for providing serial pulsed sum and difference signals that can be compared simultaneously by the phase comparators only when the restored signals appear at the respective separate output taps of the IF delay line. In such preferred embodiment the phase comparators separately provide a zero voltage error signal whenever either of the signals compared by the separate phase comparator is a zero voltage signal.

The single channel monopulse radar system of the present invention can be used in place of any conventional monopulse radar system, including those used in missile seekers where light weight, low cost, simplicity and reliability are essential characteristics.

DESCRIPTION OF THE PREFERRED EMBODIMENT

Figure 1:
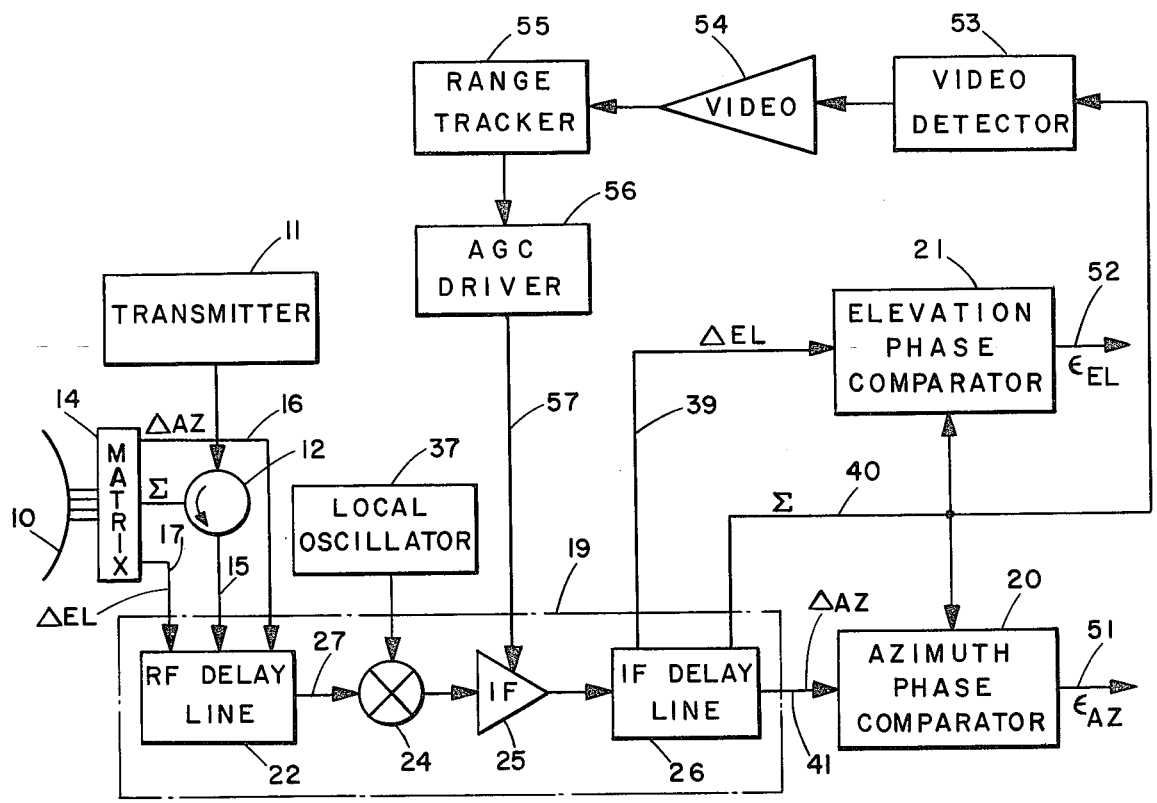
FIG. 1 is a schematic block diagram of a single channel monopulse radar system according to the present invention.

Referring to FIG. 1, a pulsed radar signal is provided to an antenna 10 for transmission from a transmitter circuit 11, via a three-port microwave circulator 12. An arithmetic matrix 14 responds to the pulsed radar signals transmitted and received by the antenna 10 to provide a pulsed sum information signal $\Sigma$ on line 15 via the circulator 12, a pulse azimuth difference information signal $\Delta AZ$ on line 16, and a pulsed elevation difference information signal $\Delta EL$ on line 17. These information signals on lines 15, 16, 17 are RF signals.

The information signals on lines 15, 16, and 17 are processed through a single channel 19 to an azimuth phase comparator 20 and an elevation phase comparator 21.

The single channel 19 includes an RF delay line 22, a single mixer 24, a single IF amplifier 25, and an IF delay line 26.

The RF delay line 22 separately delays the pulsed sum and difference information signals on lines 15, 16, and 17 so as to provide a multiplexed signal on line 27 in which the three pulsed information signals $\Sigma$, $\Delta AZ$, and $\Delta EL$ appear serially and are closely spaced in time. The RF delay line may be any tapped RF delay line which does not appreciably distort the pulse shapes. At higher microwave frequencies a tapped ferrite delay line (see FIG. 2) is preferred. At lower microwave frequencies, a tapped surface acoustic wave line can be used.

Figure 2:
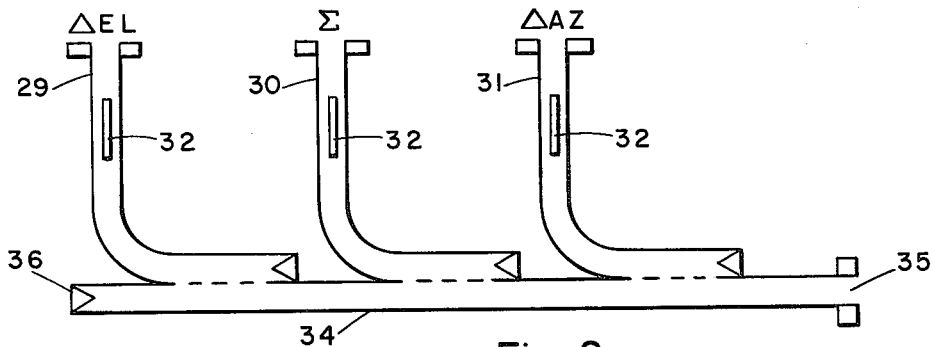
FIG. 2 is a diagram illustrating a preferred embodiment of an RF delay line included in the system shown in FIG. 1.

Referring to FIG. 2, the tapped ferrite delay line includes three input taps 29, 30, and 31, for receiving the $\Delta EL$, $\Sigma$, and $\Delta AZ$ information signals from lines 17, 15, and 16 respectively. Each of the taps 29, 30, and 31 have a ferrite phase shifter 32 and are coupled to an output line 34. The output line 34 has an output terminal 35 at one end for providing the multiplexed signal, and a termination 36 at the opposite end.

The multiplexed signal from the RF delay line 22 is converted by the mixer 24 from an RF signal to an IF signal by mixing with a signal from a local oscillator 37. Any arrangement of mixer, including single ended, balanced or double balanced may be used.

The IF amplifier 25 amplifies the multiplexed IF signal from the mixer 24. The IF amplifier 25 provides sufficient gain to allow adequate receiver dynamic range and at the same time compensate for the insertion losses of the delay lines. An embodiment that assures pulse fidelity and minimizes saturation consists of a chain of linear amplification stages with a number of PIN diode AGC attenuators distributed among the stages. A passive filter following the first (pre-amplifier) stage defines the passband which is invariant with signal strength.

The IF delay line 26 restores the phase relationship between the pulsed sum and difference information signals contained in the signal from the IF amplifier 25. The IF delay line 26 provides the restored information signals ΔEL, Σ, and ΔAZ on lines 39, 40, and 41 respectively to the elevation phase comparator 21 and the azimuth phase comparator 20.

Figure 3:
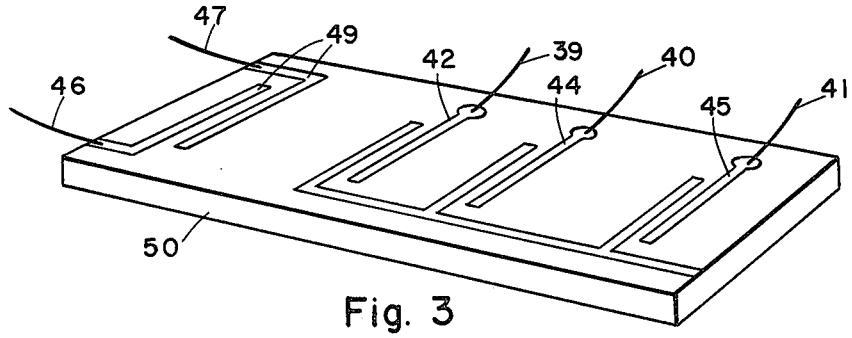
FIG. 3 is a three dimensional view of a preferred embodiment of an IF delay line included in the system shown in FIG. 1.

Referring to FIG. 3, the IF delay line 26 preferably is a tapped surface acoustic wave delay line having three output taps 42, 44, and 45. The IF signal from the IF amplifier 25 is applied on lines 46 and 47 to an input transducer 49. The IF delay line 26, too, must not appreciably alter the pulse shapes. At intermediate frequencies below about 500 MHz, a quartz substrate 50 is used so as to provide an essentially zero temperature coefficient of delay.

The electrical spacings among the delay line taps 29, 30, and 31; 42, 44, and 45 on both delay lines 22 and 26 are not equal. The spacings are such that a sum pulse and a difference pulse can be sampled simultaneously by a phase comparator 20, 21 only when they appear at their respective If delay line output taps 42, 44 and 45. The phase comparator 20, 21 output voltage is zero when either its sum or its difference input voltage is zero.

The azimuth phase comparator 20 provides an azimuth error signal $\epsilon_{AZ}$ on line 51 in response to a comparison of the ΔAZ and Σ signals received on lines 41 and 40.

The elevation phase comparator 21 provides an elevation error signal $\epsilon_{EL}$ on line 52 in response to a comparison of the ΔEL and Σ signals received on lines 39 and 40.

The Σ signal on line 40 is further processed through a video detector 53, a video amplifier 54, a range tracker 55 and an automatic gain control driver 56 to provide an automatic gain control signal on line 57 to the IF amplifier 25.

The single channel monopulse radar system of the present invention can be fabricated at any radiation frequency, utilizing any combination of tapped RF delay line, mixer, IF amplifier, and tapped IF delay line. The delay lines can be dielectric, ferrite, or acoustic wave devices, and the mixer could be balanced or single ended. Waveguide, microstrip, coaxial and related technologies are applicable to this single channel approach.

Having described my invention, I now claim:

1. A single channel monopulse radar system, comprising
    an antenna for transmitting and receiving pulsed radar signals,
    an arithmetic matrix for providing a pulsed sum information signal, a pulsed azimuth difference information signal and a pulsed elevation difference information signal in response to the pulsed radar signals transmitted and received by the antenna, wherein said information signals are RF signals;
    an azimuth phase comparator for comparing the sum signal to the azimuth difference signal to provide an azimuth angle error signal;
    an elevation phase comparator for comparing the sum signal to the elevation difference signal to provide an elevation angle error signal;
    wherein the improvement comprises:
    an RF delay line for separately delaying the pulsed sum and difference information signals so as to provide a multiplexed signal in which the three pulsed information signals appear serially and are closely spaced in time;
    a mixer for converting the multiplexed signal from an RF signal to an IF signal;
    an IF amplifier for amplifying the multiplexed IF signal; and
    an IF delay line having separate output taps for restoring the phase relationship between the pulsed sum and difference information signals contained in the amplified, multiplexed, IF signal and for simultaneously providing said restored signals at respective separate output taps to the phase comparators.

2. A radar system according to claim 1, wherein the RF delay line includes separate input taps for receiving the pulsed sum and difference signals, with the electrical spacing between the taps of both delay lines being unequal for providing said serial pulsed sum and difference signals that can be compared simultaneously by the phase comparators only when said restored signals appear at the respective separate output taps of the IF delay line.

3. A radar system according to claim 2, wherein the phase comparators comprise means for separately providing a zero voltage error signal whenever either of the signals compared by the separate phase comparator is a zero voltage signal.

4. A radar system according to claim 2, wherein the input taps of the RF delay line include ferrite phase shifters.

5. A radar system according to claim 1, wherein the IF delay line is an acoustic wave delay line having a quartz substrate.

* * * * *